US012374261B2

(12) United States Patent
Moon

(10) Patent No.: US 12,374,261 B2
(45) Date of Patent: Jul. 29, 2025

(54) DISPLAY DEVICE

(71) Applicant: Samsung Display Co., Ltd., Yongin-Si (KR)

(72) Inventor: Kyunghwan Moon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/536,354

(22) Filed: Dec. 12, 2023

(65) Prior Publication Data

US 2024/0274059 A1 Aug. 15, 2024

(51) Int. Cl.
*G09G 3/20* (2006.01)

(52) U.S. Cl.
CPC ... *G09G 3/2092* (2013.01); *G09G 2310/0275* (2013.01); *G09G 2310/08* (2013.01)

(58) Field of Classification Search
CPC .................................................... G09G 3/3233
See application file for complete search history.

(56) References Cited

U.S. PATENT DOCUMENTS 9,053,673 B2 6/2015 Yuan et al.
2003/0093715 A1* 5/2003 Hasako .................. H04N 17/04 348/E17.005
2008/0266579 A1* 10/2008 Suzuki .................. G06F 40/106 358/1.1
2012/0081410 A1* 4/2012 Yeo ...................... G09G 3/2092 345/212
2014/0168187 A1 6/2014 Qu et al.
2015/0161961 A1 6/2015 Qu et al.
2018/0061295 A1* 3/2018 Hong ..................... G09G 3/006
2018/0180958 A1* 6/2018 Huang .............. G02F 1/136259
2019/0027088 A1* 1/2019 Yu ......................... G09G 3/006

FOREIGN PATENT DOCUMENTS

KR 10-2012-0033622 A 4/2012
KR 10-1367279 B1 2/2014
KR 10-1427580 B1 8/2014
KR 10-2009888 B1 8/2019
KR 10-1987191 B1 9/2019
KR 10-2023939 B1 11/2019
KR 10-2106368 B1 5/2020

* cited by examiner

*Primary Examiner* — Nan-Ying Yang
(74) *Attorney, Agent, or Firm* — Innovation Counsel LLP

(57) ABSTRACT

A display device includes a display panel including pixels, data driver chips configured to provide data voltages to the pixels, and a timing controller configured to control the data driver chips and to provide a data signal and an emphasis voltage to each of the data driver chips. Here, the emphasis voltage is adjusted according to a length of a data signal channel that connects the timing controller to each of the data driver chips.

19 Claims, 12 Drawing Sheets

DISPLAY DEVICE

CROSS-REFERENCE TO RELATED APPLICATION

This application claims priority under 35 USC § 119 to Korean Patent Application No. 10-2023-0018339 filed on Feb. 10, 2023, in the Korean Intellectual Property Office (KIPO), the entire disclosure of which is incorporated herein by reference.

BACKGROUND

1. Field

Embodiments of the present disclosure relate to a display device. More particularly, embodiments of the present disclosure relate to a display device including data driver chips.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

The data driver may be implemented with a plurality of data driver chips. The data driver chips may receive data signals from the timing controller through data signal channels. When the data signals pass through the data signal channels, a loss may occur in the data signal. Therefore, the timing controller may apply an emphasis voltage for compensating for the loss to the data driver chips together with the data signal.

However, since lengths of the data signal channels are different from each other, loss amounts of the data signals applied to the data driver chips, respectively, may be different from each other for each of the data driver chips.

SUMMARY

An object of the present disclosure is to provide a display device capable of compensating for a loss of a data signal for each of data driver chips.

However, the object of the present disclosure is not limited thereto. Thus, the object of the present disclosure may be extended without departing from the spirit and the scope of the present disclosure.

According to embodiments, a display device may include a display panel including pixels, data driver chips configured to provide data voltages to the pixels, and a timing controller configured to control the data driver chips and to provide a data signal and an emphasis voltage to each of the data driver chips. Here, the emphasis voltage may be adjusted according to a length of a data signal channel that connects the timing controller to each of the data driver chips.

In an embodiment, the emphasis voltage may gradually increase as the length of the data signal channel increases.

In an embodiment, the timing controller may be configured to provide a first emphasis voltage to a first data driver chip among the data driver chips and to provide a second emphasis voltage that is greater than the first emphasis voltage to a second data driver chip in which the length of the data signal channel is longer than the first data driver chip among the data driver chips.

In an embodiment, the timing controller may be configured to provide the data signal as a differential signal.

In an embodiment, a swing level of the data signal may be adjusted according to the length of the data signal channel.

In an embodiment, the swing level of the data signal may gradually increase as the length of the data signal channel increases.

In an embodiment, the timing controller may be configured to provide the data signal having a first swing level to a first data driver chip among the data driver chips and to provide the data signal having a second swing level that is greater than the first swing level to a second data driver chip in which the length of the data signal channel is longer than the first data driver chip among the data driver chips.

In an embodiment, each of the data driver chips may be configured to provide error information of the data signal to the timing controller through a back channel.

In an embodiment, the timing controller may be configured to adjust the emphasis voltage based on the error information.

In an embodiment, the error information may include a cyclic redundancy check value.

In an embodiment, the emphasis voltage may be greater in a case where an error exists in the data signal than in a case where the error does not exist in the data signal.

In an embodiment, the error information may include a bit error rate.

In an embodiment, the emphasis voltage may gradually increase as the bit error rate increases.

In an embodiment, the timing controller may be configured to adjust a swing level of the data signal based on the error information.

In an embodiment, the error information may include a cyclic redundancy check value, and the swing level of the data signal may be greater in a case where an error exists in the data signal than in a case where the error does not exist in the data signal.

In an embodiment, the error information may include a bit error rate, and the swing level of the data signal may gradually increase as the bit error rate increases.

According to embodiments, a display device may include a display panel including pixels, data driver chips configured to provide data voltages to the pixels, and a timing controller configured to control the data driver chips and to provide a data signal and an emphasis voltage to each of the data driver chips. Here, a swing level of the data signal may be adjusted according to a length of a data signal channel that connects the timing controller to each of the data driver chips.

In an embodiment, each of the data driver chips may be configured to provide error information of the data signal to the timing controller through a back channel, and the timing controller may be configured to adjust the emphasis voltage based on the error information.

In an embodiment, each of the data driver chips may be configured to provide error information of the data signal to the timing controller through a back channel, and the timing controller may be configured to adjust the swing level of the data signal based on the error information.

According to embodiments, a display device may include a display panel including pixels, data driver chips configured to provide data voltages to the pixels, and a timing controller configured to control the data driver chips and to provide a data signal and an emphasis voltage to each of the data driver chips. Here, each of the data driver chips may be configured to provide error information of the data signal to the timing controller through a back channel, and the timing controller may be configured to adjust the emphasis voltage based on the error information.

Therefore, a display device according to embodiments may adjust an emphasis voltage and/or a data signal according to a length of a data signal channel, so that a difference in loss amounts of data signals according to lengths of data signal channels can be compensated for.

In addition, a display device according to embodiments may adjust an emphasis voltage and/or a data signal according to an error in the data signal, so that a difference in loss amounts of data signals according to lengths of data signal channels can be compensated for.

However, the effect of the present disclosure is not limited thereto. Thus, the effect of the present disclosure may be extended without departing from the spirit and the scope of the present disclosure.

DETAILED DESCRIPTION OF THE EMBODIMENTS

Hereinafter, embodiments of the present disclosure will be explained in detail with reference to the accompanying drawings.

Figure 1:
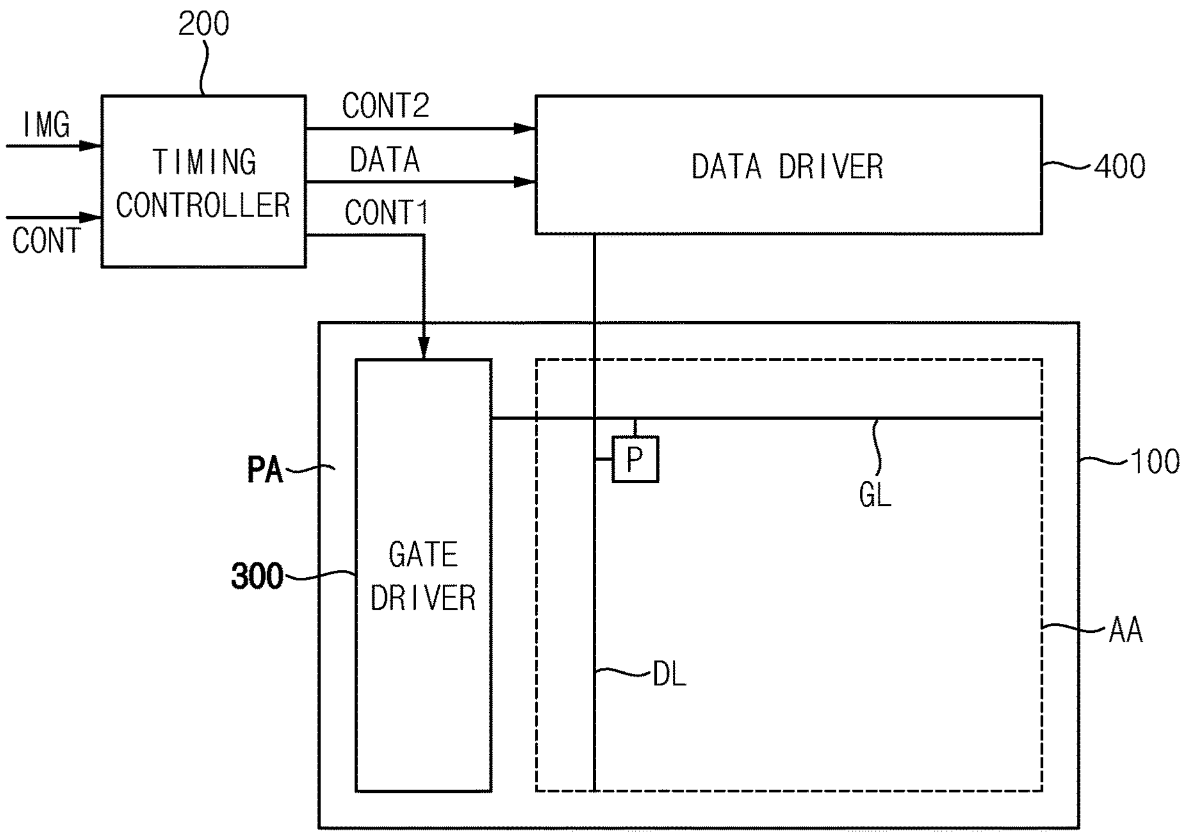
FIG. 1 is a block diagram showing a display device according to embodiments of the present disclosure.

FIG. 1 is a block diagram showing a display device according to embodiments of the present disclosure.

Referring to FIG. 1, a display device may include a display panel 100, a timing controller 200, a gate driver 300, and a data driver 400. According to one embodiment, the timing controller 200 and the data driver 400 may be integrated into one chip.

The display panel 100 may include a display part AA configured to display an image, and a peripheral part PA that is disposed adjacent to the display part AA. According to one embodiment, the gate driver 300 may be mounted on the peripheral part PA.

The display panel 100 may include a plurality of gate lines GL, a plurality of data lines DL, and a plurality of pixels P electrically connected to the gate lines GL and the data lines DL. The gate lines GL and the data lines DL may extend in directions intersecting each other.

The timing controller 200 may receive input image data IMG and an input control signal CONT from a main processor (e.g., a graphic processing unit (GPU), etc.). For example, the input image data IMG may include red image data, green image data, and blue image data. According to one embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

According to one embodiment, the data signal DATA may be a clock-embedded signal in which a clock signal is embedded. According to one embodiment, the second control signal CONT2 may be included in the data signal DATA.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

Figure 2:
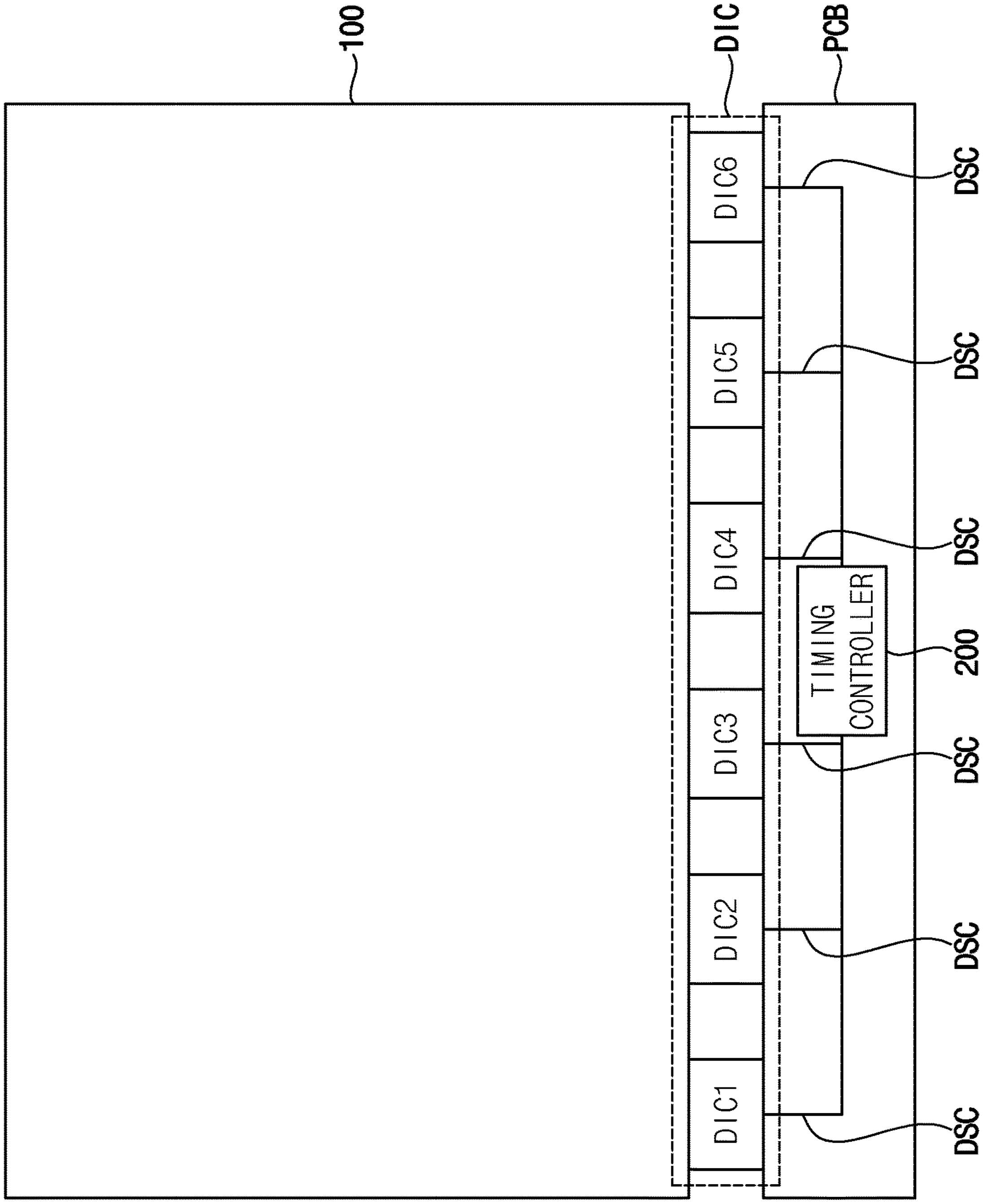
FIG. 2 is a view showing one example of a display panel, a timing controller, and data driver chips of the display device of FIG. 1.

FIG. 2 is a view showing one example of a display panel 100, a timing controller 200, and data driver chips DIC of the display device of FIG. 1.

Referring to FIGS. 1 and 2, the data driver 400 may be implemented with a plurality of data driver chips DIC. The timing controller 200 may provide the data signal DATA and an emphasis voltage (EV of FIG. 3) to each of the data driver chips DIC. The timing controller 200 may provide the second control signal CONT2 to each of the data driver chips DIC. According to one embodiment, the second control signal CONT2 may be included in the data signal DATA.

Although six data driver chips DIC have been illustrated in the present embodiment, the number of the data driver chips DIC may be altered as needed.

The timing controller 200 may be connected to the data driver chips DIC through data signal channels DSC. For example, the timing controller 200 may provide the data signal DATA and the emphasis voltage (EV of FIG. 3) to the data driver chips DIC through the data signal channels DSC.

The timing controller 200 may be disposed on a printed circuit board PCB. In addition, the data signal channel DSC may be integrated into the printed circuit board PCB.

As shown in FIG. 2, lengths of the data signal channels DSC connected to the data driver chips DIC, respectively, may be different from each other. Accordingly, loss amounts of the data signals DATA applied to the data driver chips DIC, respectively, may be different from each other for each of the data driver chips DIC.

Figure 3:
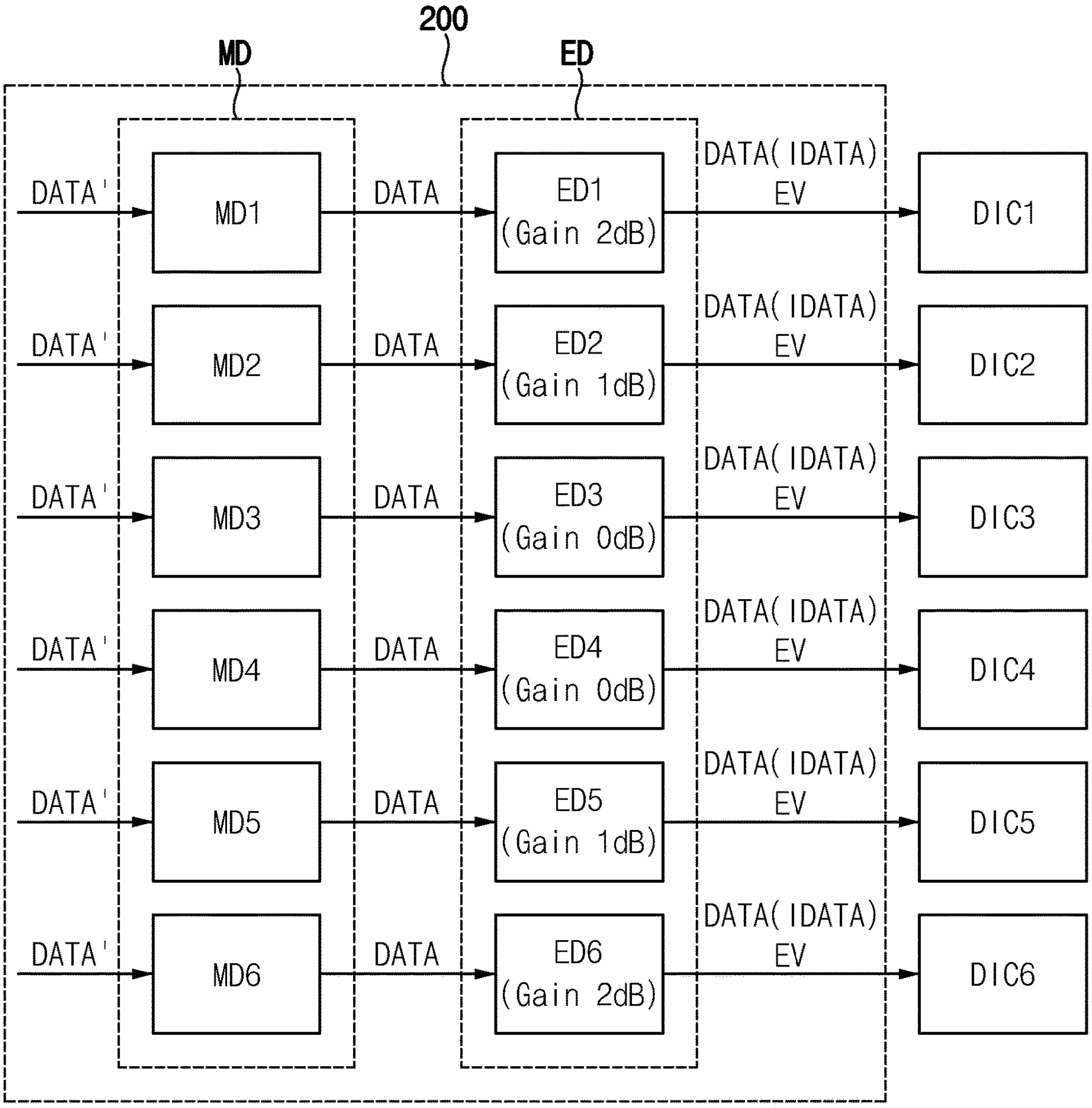
FIG. 3 is a block diagram showing one example of the timing controller and the data driver chips of FIG. 2.
Figure 4:
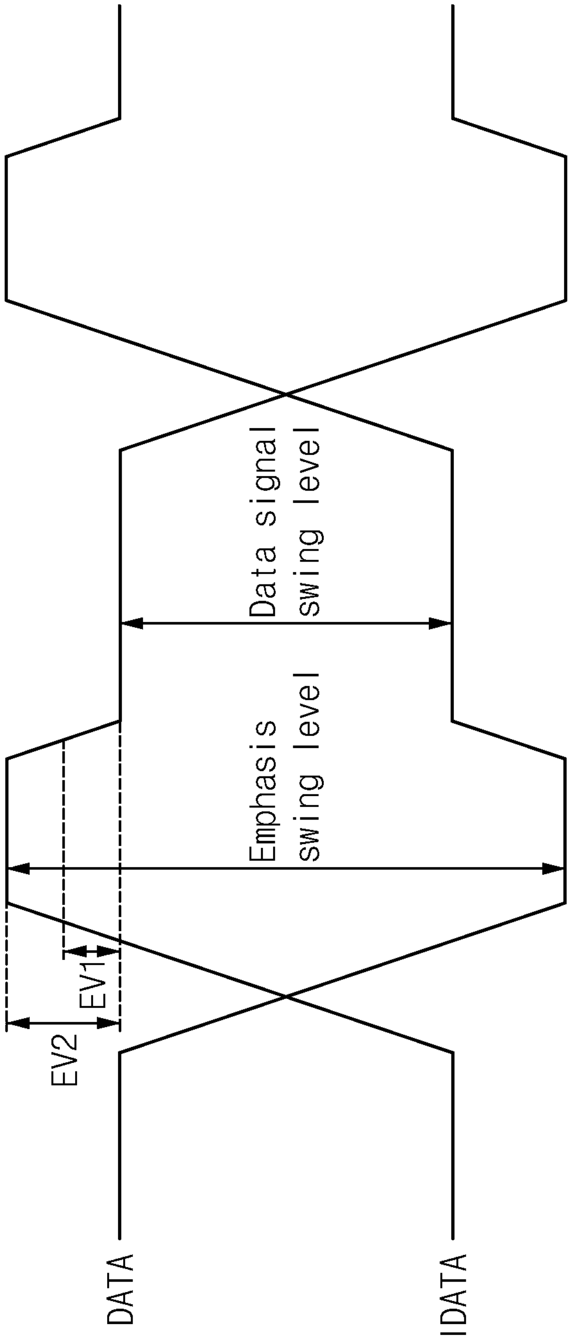
FIG. 4 is a view showing one example of a data signal and an emphasis voltage in FIG. 3.

FIG. 3 is a block diagram showing one example of the timing controller 200 and the data driver chips DIC of FIG. 2, and FIG. 4 is a view showing one example of a data signal DATA and an emphasis voltage EV in FIG. 3. FIG. 4 shows that a second emphasis voltage EV2 is applied.

Referring to FIGS. 2 and 3, the timing controller 200 may include a main driver MD and an emphasis driver ED. The main driver MD may receive a data signal DATA' before processing, and process the data signal DATA' before the processing into a data signal DATA in the form appropriate to be transmitted to the data driver chips DIC.

The emphasis driver ED may receive the data signal DATA, and generate an emphasis voltage EV based on the data signal DATA. The emphasis driver ED may provide the data signal DATA and the emphasis voltage EV to each of the data driver chips DIC.

Referring to FIGS. 2 to 4, the timing controller 200 may add the emphasis voltage EV to the data signal DATA, and provide the data signal DATA to which the emphasis voltage EV is added to the data driver chips DIC.

According to one embodiment, the timing controller 200 may provide the data signal DATA as a differential signal. For example, the timing controller 200 may invert the data signal DATA to generate an inverting data signal IDATA, and provide the data signal DATA and the inverting data signal IDATA to the data driver chips DIC. For example, the timing controller 200 may add the emphasis voltage EV to the data signal DATA, and invert the data signal DATA to which the emphasis voltage EV is added to generate the inverting data signal IDATA.

In FIG. 4, a voltage level of the data signal DATA may be determined based on a data driver chip (i.e., DIC3 and DIC4) connected to the shortest data signal channel DSC. Therefore, the emphasis voltage EV of 0 V may be provided to third and fourth data driver chips DIC3 and DIC4 (or the emphasis voltage EV may not be provided to the third and fourth data driver chips DIC3 and DIC4).

When the data signals DATA pass through the data signal channels DSC, a loss may occur in the data signal DATA. The timing controller 200 may add the emphasis voltage EV to the data signal DATA so as to compensate for the loss. In addition, the timing controller 200 may compensate for a difference in loss amounts between the data driver chips DIC.

The emphasis voltage EV may be adjusted according to a length of the data signal channel DSC that connects the timing controller 200 to each of the data driver chips DIC. For example, the emphasis voltage EV may gradually increase as the length of the data signal channel DSC increases.

For example, the timing controller 200 may provide one of an emphasis voltage EV of 0 V, a first emphasis voltage EV1 that is greater than 0 V, and a second emphasis voltage EV2 that is greater than the first emphasis voltage EV1 to each of the data driver chips DIC. For example, as shown in FIG. 2, the timing controller 200 may provide the emphasis voltage EV of 0 V to the third and fourth data driver chips DIC3 and DIC4. For example, as shown in FIG. 2, the timing controller 200 may provide the first emphasis voltage EV1 to second and fifth data driver chips DIC2 and DIC5 in which the length of the data signal channel DSC is longer than the third and fourth data driver chips DIC3 and DIC4. For example, as shown in FIG. 2, the timing controller 200 may provide the second emphasis voltage EV2 to first and sixth data driver chips DIC1 and DIC6 in which the length of the data signal channel DSC is longer than the second and fifth data driver chips DIC2 and DIC5.

For example, a gain of the emphasis driver ED may be determined according to the length of the data signal channel DSC. For example, as shown in FIG. 3, each of gains of the third and fourth emphasis drivers ED3 and ED4 may be 0 dB. For example, as shown in FIG. 3, each of gains of the second and fifth emphasis drivers ED2 and ED5 may be 1 dB. For example, as shown in FIG. 3, each of gains of the first and sixth emphasis drivers ED1 and ED6 may be 2 dB.

Here, the gain of the emphasis driver ED may be calculated by using [Formula 1].

$$\text{GAIN[dB]} = 20\log\frac{ESL}{DSSL}\text{[dB]} \qquad \text{[Formula 1]}$$

Here, GAIN is a gain of an emphasis driver ED, ESL is an emphasis swing level, and DSSL is a data signal swing level. A unit of the gain may be decibel (dB).

As shown in FIG. 4, a data signal swing level may be a swing level of a differential signal for the data signal DATA to which the emphasis voltage EV is not added. As shown in FIG. 4, an emphasis swing level may be a swing level of a differential signal for the data signal DATA to which the emphasis voltage EV is added.

According to one embodiment, the timing controller 200 may provide the same emphasis voltage EV to the data driver chips DIC in which the length of the data signal channel DSC is included within a predetermined range.

A loss of the data signal DATA may gradually increase as the length of the data signal channel DSC increases. Therefore, in order to compensate for the loss of the data signal DATA, the emphasis voltage EV may gradually increase as the length of the data signal channel DSC increases.

Although two types of emphasis voltages (i.e., EV1 and EV2) have been illustrated in the present embodiment, the number of the emphasis voltages EV may be altered as needed.

Figure 5:
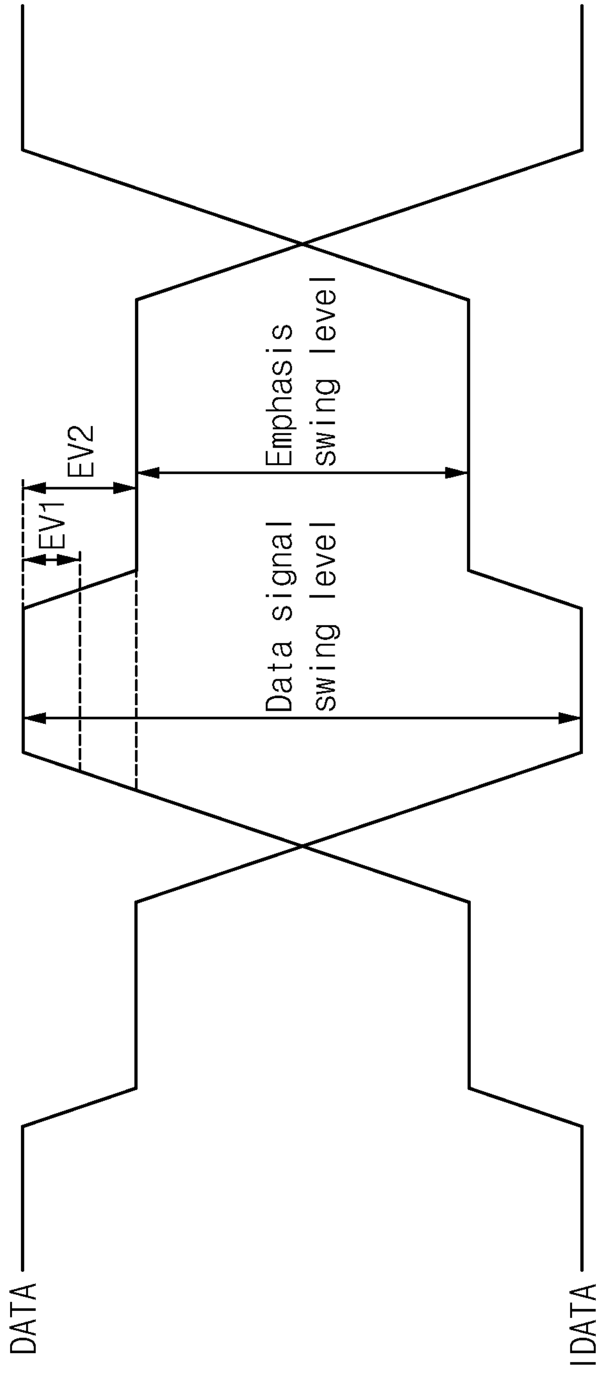
FIG. 5 is a view showing one example of a data signal and an emphasis voltage of a display device according to embodiments of the present disclosure.

FIG. 5 is a view showing one example of a data signal DATA and an emphasis voltage EV of a display device according to embodiments of the present disclosure. FIG. 5 shows that a second emphasis voltage EV2 is applied.

Since a display device according to the present embodiments has a configuration that is substantially identical to the configuration of the display device of FIG. 1 except that the emphasis voltage EV is subtracted, the same reference numbers and reference signs will be used for the same or similar components, and redundant descriptions will be omitted.

Referring to FIGS. 2, 3, and 5, the timing controller 200 may subtract the emphasis voltage EV from the data signal DATA, and provide the data signal DATA from which the emphasis voltage EV is subtracted to the data driver chips DIC.

According to one embodiment, the timing controller 200 may provide the data signal DATA as a differential signal. For example, the timing controller 200 may invert the data signal DATA to generate an inverting data signal IDATA, and provide the data signal DATA and the inverting data signal IDATA to the data driver chips DIC. For example, the timing controller 200 may subtract the emphasis voltage EV from the data signal DATA, and invert the data signal DATA from which the emphasis voltage EV is subtracted to generate the inverting data signal IDATA.

In FIG. 5, a voltage level of the data signal DATA may be determined based on the data driver chip (i.e., DIC1 and DIC6) connected to the longest data signal channel DSC. Therefore, the emphasis voltage EV of 0 V may be provided to first and sixth data driver chips DIC1 and DIC6 (or the emphasis voltage EV may not be provided to the first and sixth data driver chips DIC1 and DIC6).

When the data signals DATA pass through the data signal channels DSC, a loss may occur in the data signal DATA. The timing controller 200 may determine the voltage level of the data signal DATA based on the data driver chip (i.e., DIC1 and DIC6) connected to the longest data signal channel DSC so as to compensate for the loss. In addition, the timing controller 200 may subtract the emphasis voltage EV from the data signal DATA so as to compensate for a difference in loss amounts between the data driver chips DIC.

The emphasis voltage EV may be adjusted according to a length of the data signal channel DSC that connects the timing controller 200 to each of the data driver chips DIC. For example, the emphasis voltage EV may gradually increase as the length of the data signal channel DSC decreases.

For example, the timing controller 200 may provide one of an emphasis voltage EV of 0 V, a first emphasis voltage EV1 that is greater than 0 V, and a second emphasis voltage EV2 that is greater than the first emphasis voltage EV1 to each of the data driver chips DIC. For example, as shown in FIG. 2, the timing controller 200 may provide the emphasis voltage EV of 0 V to the first and sixth data driver chips DIC1 and DIC6. For example, as shown in FIG. 2, the timing controller 200 may provide the first emphasis voltage EV1 to second and fifth data driver chips DIC2 and DIC5 in which the length of the data signal channel DSC is shorter than the first and sixth data driver chips DIC1 and DIC6. For example, as shown in FIG. 2, the timing controller 200 may provide the second emphasis voltage EV2 to third and fourth data driver chips DIC3 and DIC4 in which the length of the data signal channel DSC is shorter than the second and fifth data driver chips DIC2 and DIC5.

For example, a gain of the emphasis driver ED may be determined according to the length of the data signal channel DSC. For example, each of gains of the first and sixth emphasis drivers ED1 and ED6 may be 0 dB. For example, each of gains of the second and fifth emphasis drivers ED2 and ED5 may be 1 dB. For example, each of gains of the third and fourth emphasis drivers ED3 and ED4 may be 2 dB.

Here, the gain of the emphasis driver ED may be calculated by using [Formula 2].

$$\text{GAIN[dB]} = 20\log\frac{DSSL}{ESL}\text{[dB]} \qquad \text{[Formula 2]}$$

Here, GAIN is a gain of an emphasis driver ED, ESL is an emphasis swing level, and DSSL is a data signal swing level. A unit of the gain may be decibel (dB).

As shown in FIG. 5, a data signal swing level may be a swing level of a differential signal for the data signal DATA from which the emphasis voltage EV is not subtracted. As shown in FIG. 5, an emphasis swing level may be a swing level of a differential signal for the data signal DATA from which the emphasis voltage EV is subtracted.

According to one embodiment, the timing controller 200 may provide the same emphasis voltage EV to the data driver chips DIC in which the length of the data signal channel DSC is included within a predetermined range.

A loss of the data signal DATA may gradually increase as the length of the data signal channel DSC increases. Therefore, in order to compensate for the loss of the data signal DATA, the emphasis voltage EV may gradually increase as the length of the data signal channel DSC decreases.

Although two types of emphasis voltages (i.e., EV1 and EV2) have been illustrated in the present embodiment, the number of the emphasis voltages EV may be altered as needed.

Figure 6:
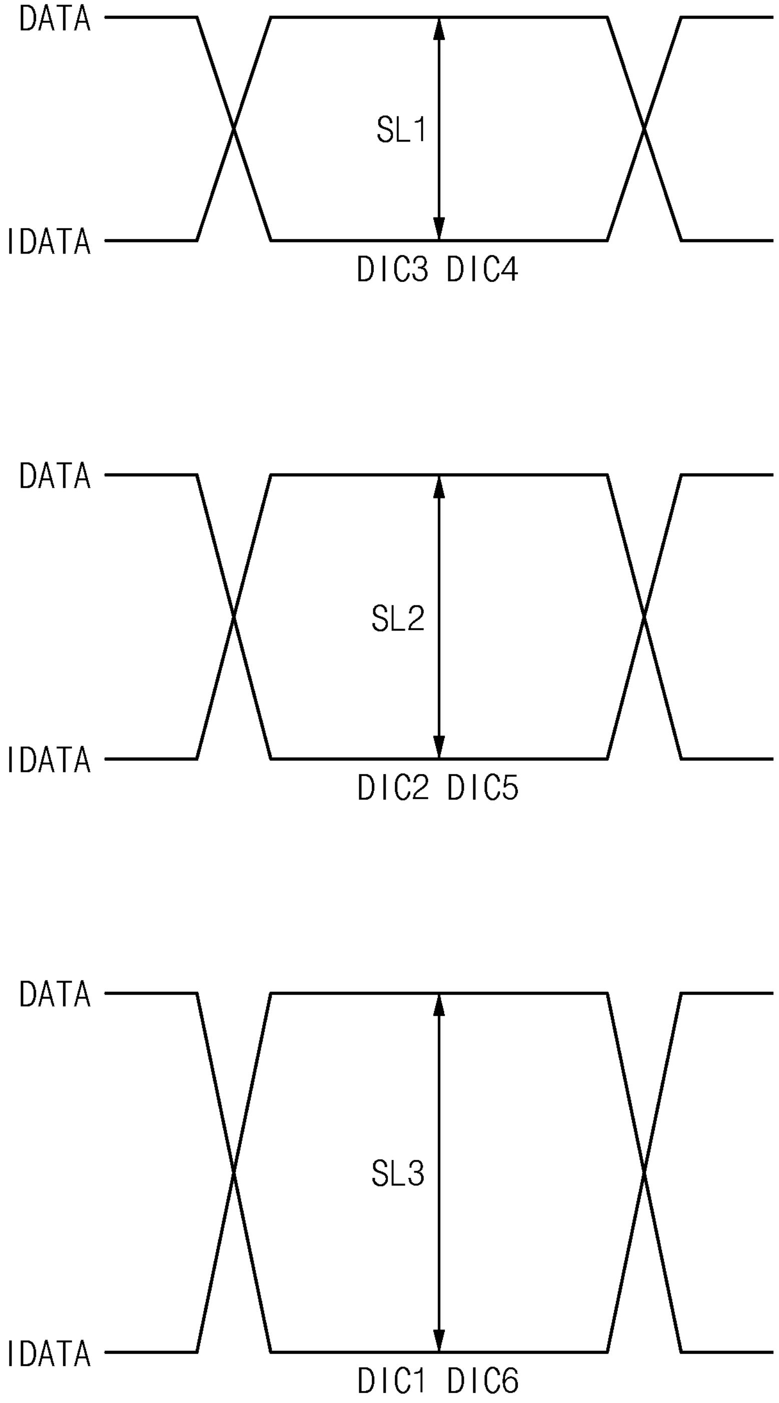
FIG. 6 is a view showing one example of a data signal of a display device according to embodiments of the present disclosure.

FIG. 6 is a view showing one example of a data signal DATA of a display device according to embodiments of the present disclosure.

Since a display device according to the present embodiments has a configuration that is substantially identical to the configuration of the display device of FIG. 1 except that a swing level of the data signal DATA is adjusted instead of the swing level of the emphasis voltage EV, the same reference numbers and reference signs will be used for the same or similar components, and redundant descriptions will be omitted.

Referring to FIGS. 2 and 6, a swing level of the data signal DATA may be adjusted according to a length of the data signal channel DSC. When the data signal DATA is provided as a differential signal, the swing level of the data signal DATA may be a swing level of the differential signal. For example, the swing level of the data signal DATA may gradually increase as the length of the data signal channel DSC increases.

For example, as shown in FIG. 6, the timing controller 200 may provide the data signal DATA having a first swing level SL1 to third and fourth data driver chips DIC3 and DIC4. For example, as shown in FIG. 6, the timing controller 200 may provide the data signal DATA having a second swing level SL2 that is greater than the first swing level SL1 to second and fifth data driver chips DIC2 and DIC5 in which the length of the data signal channel DSC is longer than the third and fourth data driver chips DIC3 and DIC4. For example, as shown in FIG. 6, the timing controller 200 may provide the data signal DATA having a third swing level SL3 that is greater than the second swing level SL2 to first and sixth data driver chips DIC1 and DIC6 in which the length of the data signal channel DSC is longer than the second and fifth data driver chips DIC2 and DIC5.

According to one embodiment, the timing controller 200 may provide the data signal DATA having the same swing level to the data driver chips DIC in which the length of the data signal channel DSC is included within a predetermined range.

A loss of the data signal DATA may gradually increase as the length of the data signal channel DSC increases. Therefore, in order to compensate for the loss of the data signal DATA, the swing level of the data signal DATA may gradually increase as the length of the data signal channel DSC increases.

Although three types of swing levels (i.e., SL1, SL2, and SL3) have been illustrated in the present embodiment, the number of the swing levels may be altered as needed.

Although the timing controller 200 has been illustrated in the present embodiment as not providing the emphasis voltage (EV of FIG. 3), the present disclosure is not limited thereto. For example, the timing controller 200 may provide the emphasis voltage (EV of FIG. 3) to the data driver chips DIC while adjusting the swing level of the data signal DATA.

Figure 7:
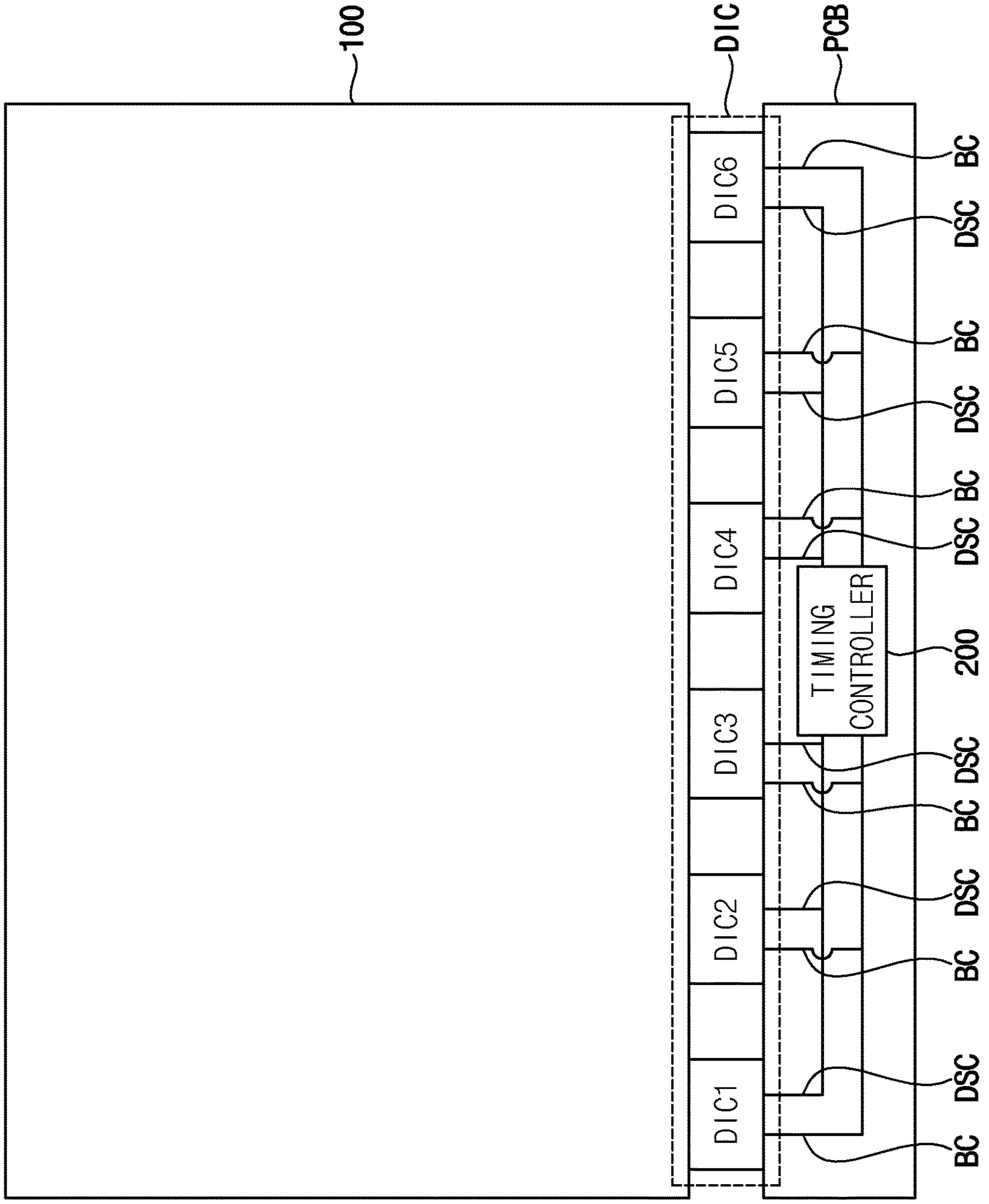
FIG. 7 is a view showing a display panel, a timing controller, and data driver chips of a display device according to embodiments of the present disclosure.
Figure 8:
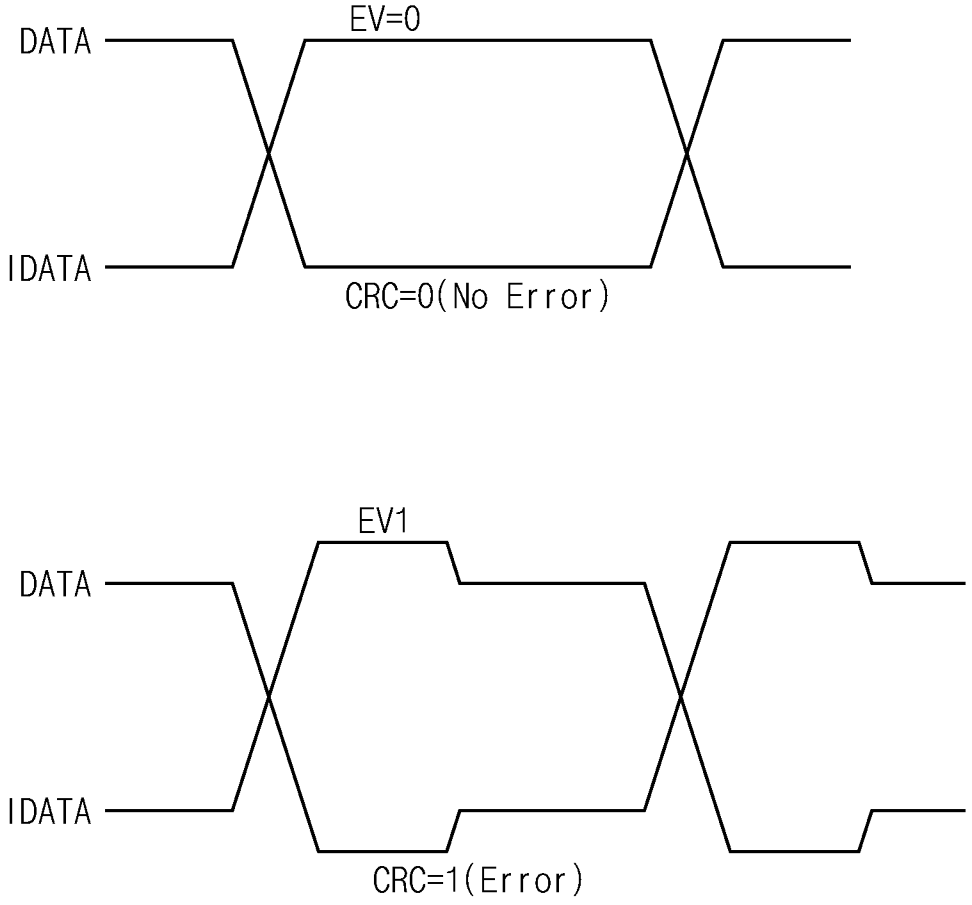
FIG. 8 is a view showing one example of a data signal and an emphasis voltage of the display device of FIG. 7.

FIG. 7 is a view showing a display panel 100, a timing controller 200, and data driver chips DIC of a display device according to embodiments of the present disclosure, and FIG. 8 is a view showing one example of a data signal DATA and an emphasis voltage EV of the display device of FIG. 7.

Since a display device according to the present embodiments has a configuration that is substantially identical to the configuration of the display device of FIG. 1 except that the emphasis voltage EV is adjusted through error information, the same reference numbers and reference signs will be used for the same or similar components, and redundant descriptions will be omitted.

Referring to FIGS. 3, 7, and 8, the data driver chips DIC may detect an error in the data signal DATA. The data driver chips DIC may provide error information of the data signal DATA to the timing controller 200 through a back channel BC. The timing controller 200 may adjust the emphasis voltage EV based on the error information.

According to one embodiment, the error information may be a cyclic redundancy check value CRC. The cyclic redundancy check value CRC may be obtained by comparing transmission data (i.e., the data signal DATA output from the timing controller 200) with reception data (i.e., the data signal DATA input to each of the data driver chips DIC).

For example, when the transmission data and the reception data are different from each other, the cyclic redundancy check value CRC may be 1. In other words, when the cyclic redundancy check value CRC is 1, an error may exist in the data signal DATA input to the data driver chip DIC.

For example, when the transmission data and the reception data are identical to each other, the cyclic redundancy check value CRC may be 0. In other words, when the cyclic redundancy check value CRC is 0, the error may not exist in the data signal DATA input to the data driver chip DIC.

A loss amount of the data signal DATA may gradually increase as the length of the data signal channel DSC increases. The data driver chip DIC to which the data signal DATA having the error is input may be a data driver chip DIC in which the loss amount of the data signal DATA is large. Therefore, the emphasis voltage EV may be greater in a case where an error exists in the data signal DATA than in a case where the error does not exist in the data signal DATA.

For example, the timing controller 200 may provide one of an emphasis voltage EV of 0 V, and a first emphasis voltage EV1 that is greater than 0 V to each of the data driver chips DIC. For example, as shown in FIG. 8, the timing controller 200 may provide the emphasis voltage EV of 0 V to the data driver chip DIC in which the cyclic redundancy check value CRC is 0. For example, as shown in FIG. 8, the timing controller 200 may provide the first emphasis voltage EV1 to the data driver chip DIC in which the cyclic redundancy check value CRC is 1.

For example, a gain of the emphasis driver ED for the data driver chip DIC in which the cyclic redundancy check value CRC is 0 may be 0 dB. For example, a gain of the emphasis driver ED for the data driver chip DIC in which the cyclic redundancy check value CRC is 1 may be 1 dB.

Figure 9:
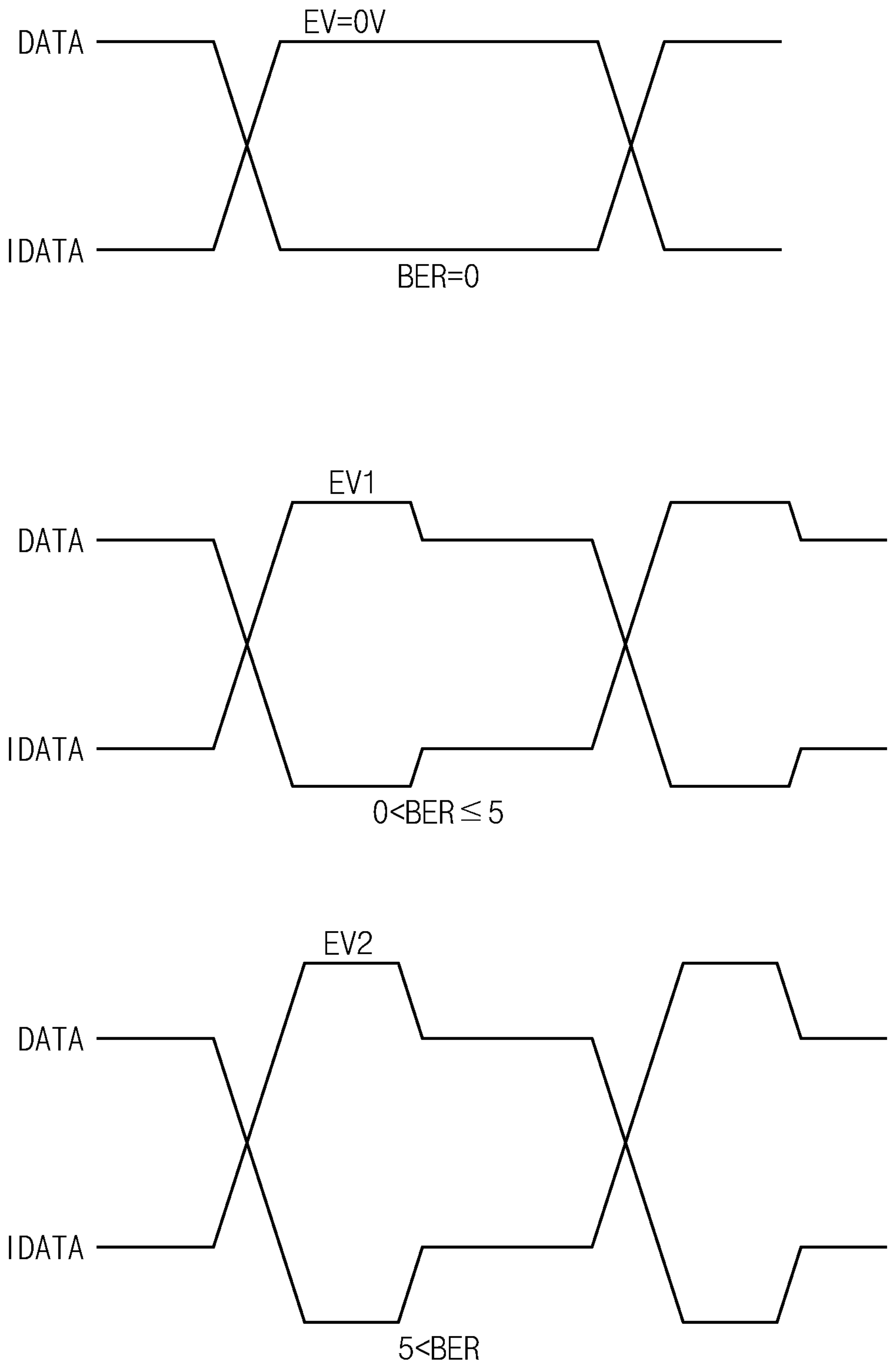
FIG. 9 is a view showing a data signal and an emphasis voltage of a display device according to embodiments of the present disclosure.

FIG. 9 is a view showing a data signal DATA and an emphasis voltage EV of a display device according to embodiments of the present disclosure.

Since a display device according to the present embodiments has a configuration that is substantially identical to the configuration of the display device of FIGS. 7 and 8 except that the error information is a bit error rate BER, the same reference numbers and reference signs will be used for the same or similar components, and redundant descriptions will be omitted.

Referring to FIGS. 3, 7, and 9, the error information may be a bit error rate BER. The bit error rate BER may be the number of error bits detected per second.

A loss amount of the data signal DATA may gradually increase as the length of the data signal channel DSC increases. The data driver chip DIC to which the data signal DATA having the error is input may be a data driver chip DIC in which the loss amount of the data signal DATA is large. Therefore, the emphasis voltage EV may gradually increase as the bit error rate BER increases.

For example, the timing controller 200 may provide one of an emphasis voltage EV of 0 V, a first emphasis voltage EV1 that is greater than 0 V, and a second emphasis voltage EV2 that is greater than the first emphasis voltage EV1 to each of the data driver chips DIC. For example, as shown in FIG. 9, the timing controller 200 may provide the emphasis voltage EV of 0 V to the data driver chip DIC in which the bit error rate BER is 0. For example, as shown in FIG. 9, the timing controller 200 may provide the first emphasis voltage EV1 to the data driver chip DIC in which the bit error rate BER is greater than 0, and less than or equal to 5. For example, as shown in FIG. 9, the timing controller 200 may provide the second emphasis voltage EV2 to the data driver chip DIC in which the bit error rate BER is greater than 5.

Although the bit error rate BER has been illustrated in the present embodiment as having three sections to provide the emphasis voltage EV, the number of the sections of the bit error rate BER may be altered as needed.

Figure 10:
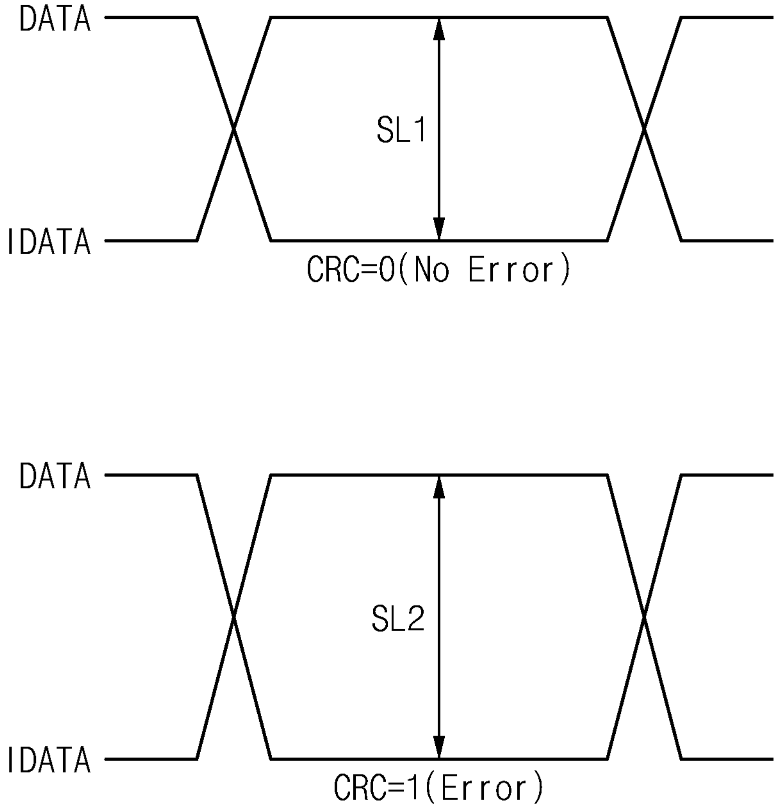
FIG. 10 is a view showing one example of a data signal and an emphasis voltage of a display device according to embodiments of the present disclosure.

FIG. 10 is a view showing one example of a data signal DATA and an emphasis voltage EV of a display device according to embodiments of the present disclosure.

Since a display device according to the present embodiments has a configuration that is substantially identical to the configuration of the display device of FIGS. 7 and 8 except that a swing level of the data signal DATA is adjusted instead of a swing level of the emphasis voltage EV, the same reference numbers and reference signs will be used for the same or similar components, and redundant descriptions will be omitted.

Referring to FIGS. 7 and 10, the timing controller 200 may adjust a swing level of the data signal DATA based on error information.

A loss amount of the data signal DATA may gradually increase as the length of the data signal channel DSC increases. The data driver chip DIC to which the data signal DATA having the error is input may be a data driver chip DIC in which the loss amount of the data signal DATA is large. Therefore, the swing level of the data signal DATA may be greater in a case where an error exists in the data signal DATA than a case where the error does not exist in the data signal DATA.

For example, as shown in FIG. 10, the timing controller 200 may provide the data signal DATA having a first swing level SL1 to the data driver chip DIC in which the cyclic redundancy check value CRC is 0. For example, as shown in FIG. 10, the timing controller 200 may provide the data signal DATA having a second swing level SL2 that is greater than the first swing level SL1 to the data driver chip DIC in which the cyclic redundancy check value CRC is 1.

Figure 11:
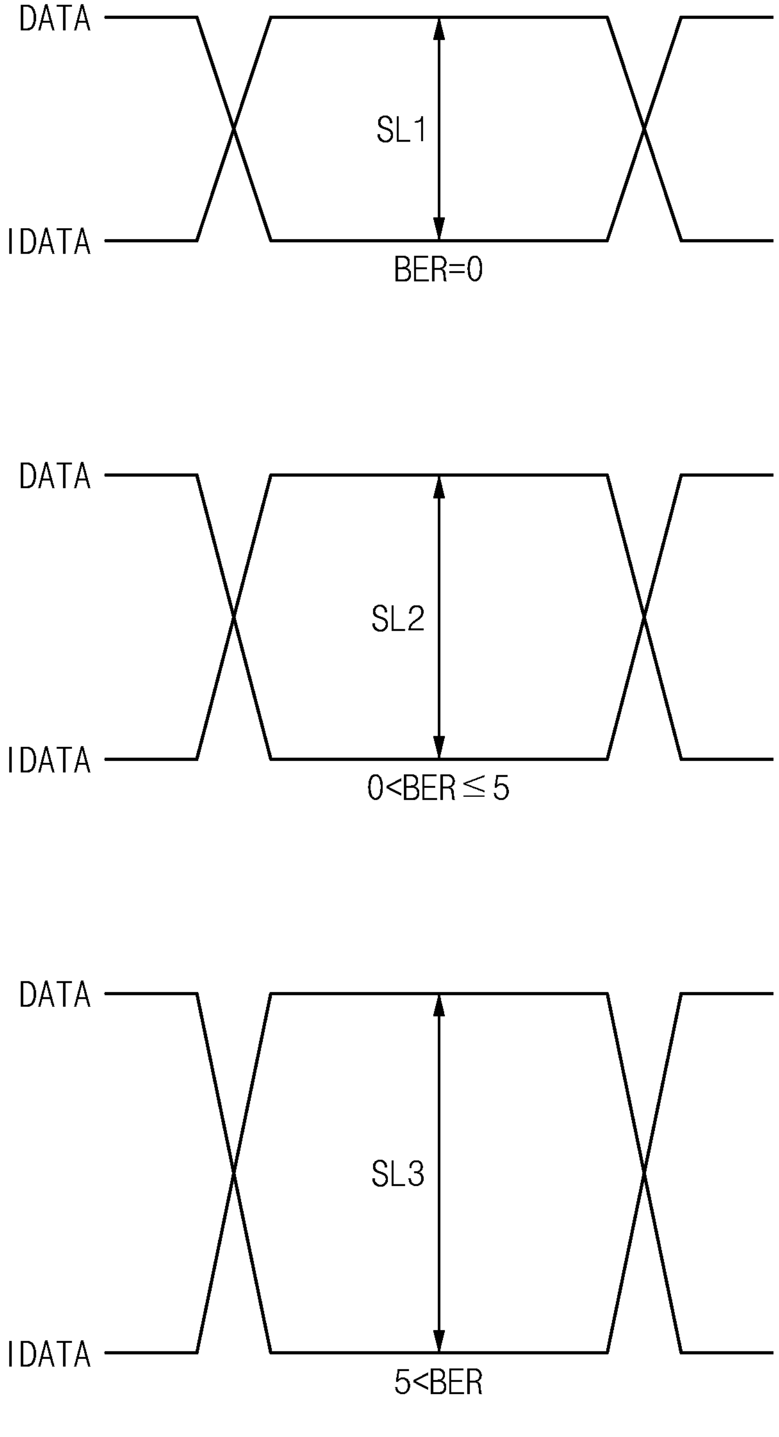
FIG. 11 is a view showing one example of a data signal and an emphasis voltage of a display device according to embodiments of the present disclosure.

FIG. 11 is a view showing one example of a data signal DATA and an emphasis voltage EV of a display device according to embodiments of the present disclosure.

Since a display device according to the present embodiments has a configuration that is substantially identical to the configuration of the display device of FIG. 9 except that a swing level of the data signal DATA is adjusted instead of the emphasis voltage EV, the same reference numbers and reference signs will be used for the same or similar components, and redundant descriptions will be omitted.

Referring to FIGS. 7 and 11, the timing controller 200 may adjust a swing level of the data signal DATA based on error information.

A loss amount of the data signal DATA may gradually increase as the length of the data signal channel DSC increases. The data driver chip DIC to which the data signal DATA having the error is input may be a data driver chip DIC in which the loss amount of the data signal DATA is large. Therefore, the swing level of the data signal DATA may gradually increase as the bit error rate BER increases.

For example, as shown in FIG. 11, the timing controller 200 may provide the data signal DATA having a first swing level SL1 to the data driver chip DIC in which the bit error rate BER is 0. For example, as shown in FIG. 11, the timing controller 200 may provide the data signal DATA having a second swing level SL2 that is greater than the first swing level SL1 to the data driver chip DIC in which the bit error rate BER is greater than 0, and less than or equal to 5. For example, as shown in FIG. 11, the timing controller 200 may provide the data signal DATA having a third swing level SL3 that is greater than the second swing level SL2 to the data driver chip DIC in which the bit error rate BER is greater than 5.

Figure 12:
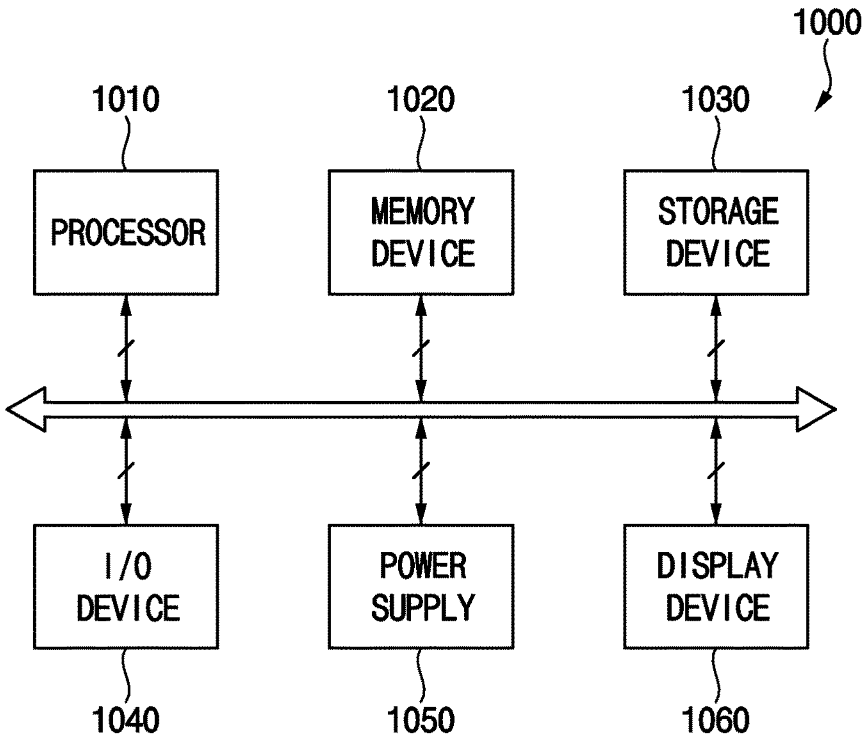
FIG. 12 is a block diagram showing an electronic device according to embodiments of the present disclosure.
Figure 13:
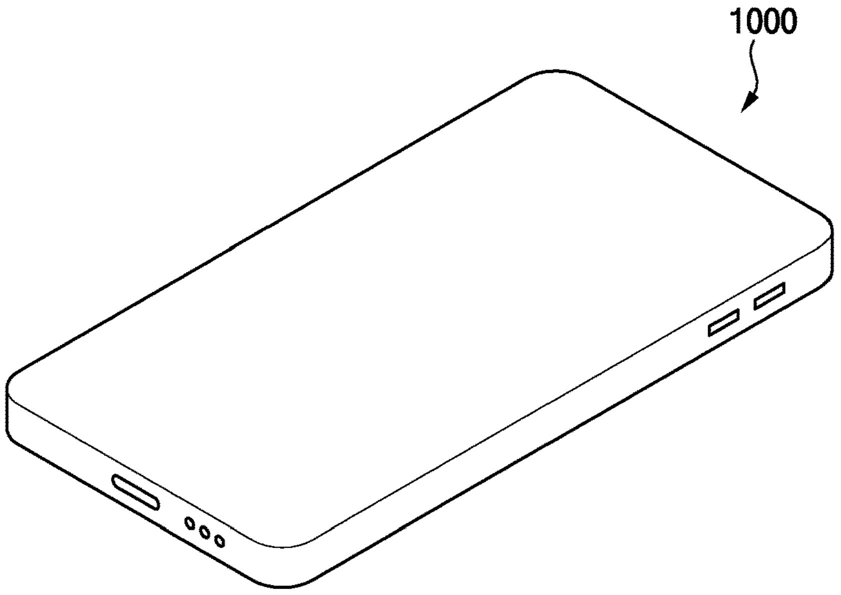
FIG. 13 is a diagram showing one example in which the electronic device of FIG. 12 is implemented as a smart phone.

FIG. 12 is a block diagram showing an electronic device 1000 according to embodiments of the present disclosure, and FIG. 13 is a diagram showing one example in which the electronic device 1000 of FIG. 12 is implemented as a smart phone.

Referring to FIGS. 12 and 13, the electronic device 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc. In an embodiment, as shown in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a microprocessor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc., and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. In some embodiments, the display device 1060 may be an organic light emitting display device or a quantum dot light emitting display device, but is not limited thereto. The display device 1060 may be connected to other components through the buses or other communication links. Here, the display device 1060 may adjust an emphasis voltage or a data signal according to a length of a data signal channel, so that a difference in loss amounts of data signals according to lengths of data signal channels may be compensated for.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:
a display panel including pixels;
data driver chips configured to provide data voltages to the pixels; and
a timing controller configured to control the data driver chips and to provide a data signal and an emphasis voltage to each of the data driver chips,
wherein the emphasis voltage is adjusted according to a length of a data signal channel that connects the timing controller to each of the data driver chips, and
wherein each of the data driver chips is configured to provide error information of the data signal to the timing controller through a back channel which is separated from the data signal channel and is connected between each of the data driver chips and the timing controller.

2. The display device of claim 1, wherein the emphasis voltage gradually increase as the length of the data signal channel increases.

3. The display device of claim 1, wherein the timing controller is configured to provide a first emphasis voltage to a first data driver chip among the data driver chips and to provide a second emphasis voltage that is greater than the first emphasis voltage to a second data driver chip in which the length of the data signal channel is longer than the first data driver chip among the data driver chips.

4. The display device of claim 1, wherein the timing controller is configured to provide the data signal as a differential signal.

5. The display device of claim 1, wherein a swing level of the data signal is adjusted according to the length of the data signal channel.

6. The display device of claim 5, wherein the swing level of the data signal gradually increase as the length of the data signal channel increases.

7. The display device of claim 1, wherein the timing controller is configured to provide the data signal having a first swing level to a first data driver chip among the data driver chips and to provide the data signal having a second swing level that is greater than the first swing level to a second data driver chip in which the length of the data signal channel is longer than the first data driver chip among the data driver chips.

8. The display device of claim 1, wherein the timing controller is configured to adjust the emphasis voltage based on the error information.

9. The display device of claim 8, wherein the error information includes a cyclic redundancy check value.

10. The display device of claim 9, wherein the emphasis voltage is greater in a case where an error exists in the data signal than in a case where the error does not exist in the data signal.

11. The display device of claim 8, wherein the error information includes a bit error rate.

12. The display device of claim 11, wherein the emphasis voltage gradually increase as the bit error rate increases.

13. The display device of claim 1, wherein the timing controller is configured to adjust a swing level of the data signal based on the error information.

14. The display device of claim 13, wherein the error information includes a cyclic redundancy check value, and the swing level of the data signal is greater in a case where an error exists in the data signal than in a case where the error does not exist in the data signal.

15. The display device of claim 13, wherein the error information includes a bit error rate, and the swing level of the data signal gradually increase as the bit error rate increases.

16. A display device comprising:
a display panel including pixels;
data driver chips configured to provide data voltages to the pixels; and
a timing controller configured to control the data driver chips and to provide a data signal and an emphasis voltage to each of the data driver chips,
wherein a swing level of the data signal is adjusted according to a length of a data signal channel that connects the timing controller to each of the data driver chips, and
wherein each of the data driver chips is configured to provide error information of the data signal to the timing controller through a back channel which is separated from the data signal channel and is connected between each of the data driver chips and the timing controller.

17. The display device of claim 16, wherein the timing controller is configured to adjust the emphasis voltage based on the error information.

18. The display device of claim 16, wherein the timing controller is configured to adjust the swing level of the data signal based on the error information.

19. A display device comprising:
a display panel including pixels;
data driver chips configured to provide data voltages to the pixels; and
a timing controller configured to control the data driver chips and to provide a data signal and an emphasis voltage to each of the data driver chips,
wherein each of the data driver chips is configured to provide error information of the data signal to the timing controller through a back channel connected between each of the data driver chips and the timing controller, and the timing controller is configured to adjust the emphasis voltage based on the error information, and
wherein each of the data driver chips is configured to provide error information of the data signal to the timing controller through a back channel which is separated from the data signal channel and is connected between each of the data driver chips and the timing controller.

* * * * *